United States Patent
Rayudu et al.

(10) Patent No.: US 12,026,715 B1
(45) Date of Patent: Jul. 2, 2024

(54) ONE-TIME PASSCODE

(71) Applicant: Wells Fargo Bank, N.A., San Francisco, CA (US)

(72) Inventors: Sri Rajesh Rayudu, Hyderabad (IN); Ramanathan Ramanathan, Bellevue, WA (US); Santosh Nichani, Secunderabad (IN); Srinivas Vengala, Secunderabad (IN); Shanmukeswara R. Donkada, Hyderabad (IN)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 17/936,098

(22) Filed: Sep. 28, 2022

Related U.S. Application Data

(63) Continuation of application No. 16/723,603, filed on Dec. 20, 2019, now Pat. No. 11,488,168, which is a continuation of application No. 15/435,608, filed on Feb. 17, 2017, now Pat. No. 10,558,978.

(60) Provisional application No. 62/440,544, filed on Dec. 30, 2016.

(51) Int. Cl.
G06Q 20/40 (2012.01)
G06Q 20/20 (2012.01)
H04L 9/40 (2022.01)

(52) U.S. Cl.
CPC ..... *G06Q 20/40145* (2013.01); *G06Q 20/206* (2013.01); *H04L 63/0838* (2013.01); *H04L 63/0861* (2013.01)

(58) Field of Classification Search
CPC ........... G06Q 20/40145; G06Q 20/206; H04L 63/0838; H04L 63/0861
USPC .............................................. 705/1.1, 35, 44
See application file for complete search history.

(56) References Cited

U.S. PATENT DOCUMENTS

| | | |
|---|---|---|
| 6,957,185 B1 | 10/2005 | Labaton |
| 8,266,441 B2 | 9/2012 | Inskeep et al. |
| 8,832,807 B1 | 9/2014 | Kuo et al. |
| 8,843,757 B2 | 9/2014 | Varadarajan |
| 8,989,954 B1 | 3/2015 | Addepalli et al. |
| 9,047,473 B2 * | 6/2015 | Samuelsson ............ G06F 21/60 |
| 9,235,697 B2 | 1/2016 | Fiske |
| 11,558,978 B2 | 1/2023 | Wang et al. |
| 2003/0212894 A1 | 11/2003 | Buck et al. |
| 2008/0101339 A1 * | 5/2008 | Forbes .................... H04L 12/66 370/352 |
| 2008/0103984 A1 * | 5/2008 | Choe ..................... H04L 9/3228 705/16 |
| 2009/0328168 A1 | 12/2009 | Lee |
| 2010/0064341 A1 | 3/2010 | Aldera |
| 2010/0180328 A1 * | 7/2010 | Moas .................. H04L 63/0838 713/168 |

(Continued)

FOREIGN PATENT DOCUMENTS

| | | | | |
|---|---|---|---|---|
| EP | 2744158 A1 * | 6/2014 | ............ | G06Q 10/10 |
| WO | 2008/032916 A1 | 3/2008 | | |

*Primary Examiner* — William E Rankins

(74) *Attorney, Agent, or Firm* — Merchant & Gould P.C.

(57) ABSTRACT

A financial system receives a transaction request and transmits a one-time passcode to a consumer associated with the transaction request. Transmission of the one-time passcode is typically via a first channel. If the system determines that the one-time passcode was not delivered, a second channel is utilized. Depending upon the success of delivering the one-time passcode, more than one type of communication channel can be used.

16 Claims, 4 Drawing Sheets

(56) References Cited

U.S. PATENT DOCUMENTS

| | | | |
|---|---|---|---|
| 2011/0069720 A1 | 3/2011 | Jacobs et al. | |
| 2011/0307388 A1* | 12/2011 | Kim | G06Q 20/32 |
| | | | 705/67 |
| 2012/0117178 A1* | 5/2012 | Price | H04W 24/08 |
| | | | 709/207 |
| 2014/0012929 A1 | 1/2014 | Weishaupl | |
| 2016/0286355 A1 | 9/2016 | Shur et al. | |
| 2016/0358139 A1* | 12/2016 | Keys | G06Q 20/385 |
| 2016/0364559 A1* | 12/2016 | Bali | G06F 21/62 |
| 2017/0091765 A1 | 3/2017 | Lloyd et al. | |
| 2017/0331819 A1 | 11/2017 | Quirke et al. | |

\* cited by examiner

ONE-TIME PASSCODE

CROSS-REFERENCE TO RELATED APPLICATIONS

The present application claims priority from U.S. Provisional Patent Application No. 62/440,544, filed on Dec. 30, 2016, the disclosure of which is hereby incorporated by reference in its entirety.

INTRODUCTION

Some transactions between consumers and/or between a consumer and an institution are high value. Oftentimes, one or more validations steps must be completed before lending or financial institutions approve high value transactions. As one example, two-factor authentication is used by some institutions when a consumer is requesting a purchase over a threshold amount or when requesting a monetary transfer to a different account.

Two-factor authentication can take many forms. Essentially, two-factor authentication requires the consumer to provide two pieces of information, each of a different type. In some instances, a consumer presents something they know, such as a saved password, and something they have (i.e., accessible only by that consumer).

SUMMARY

Examples and embodiments described herein relate to systems and methods for completing transactions, particularly financial transactions. Generally, the systems include a first device, a second device, and a financial system. Communication between the first device and the financial system occurs via a first channel, such as short message service (SMS). Communication between the second device and the financial system occurs via a second channel, such as SMS, interactive voice response, push, point of sale device, kiosk, and devices associated with a consumer requesting the transaction.

In one aspect, the financial system including a processing unit and system memory is configured to receive a request for a transaction from a consumer, transmit a one-time passcode to a device associated with the consumer via a first channel, receive notification regarding transmitting the one-time passcode, including a delivery state of the one-time passcode, and when the delivery state indicates that the one-time passcode was not delivered, transmit the one-time passcode via a second channel.

In another aspect, a computer-implemented method for conducting a transaction includes receiving a request for the transaction, generating a one-time passcode for the transaction, transmitting the one-time passcode to a first device via a first channel, the first channel including short message service (SMS), receiving notification regarding transmitting the one-time passcode, including a delivery state of the one-time passcode, when delivery state indicates that the one-time passcode was not delivered, transmitting the one-time passcode via a second channel including interactive voice response, when interactive voice response fails, receiving authentication data from a point of sale device, the authentication data including biometric data, and upon validating the authentication data, transmitting the one-time passcode to the point of sale device.

The details of one or more embodiments are set forth in the accompanying drawings and the description below.

Other features, objects, and advantages of these embodiments will be apparent from the description, drawings, and claims.

DESCRIPTION OF THE DRAWINGS

The following drawing figures, which form a part of this application, are illustrative of described technology and are not meant to limit the scope of the disclosure in any manner.

DETAILED DESCRIPTION

Figure 1:
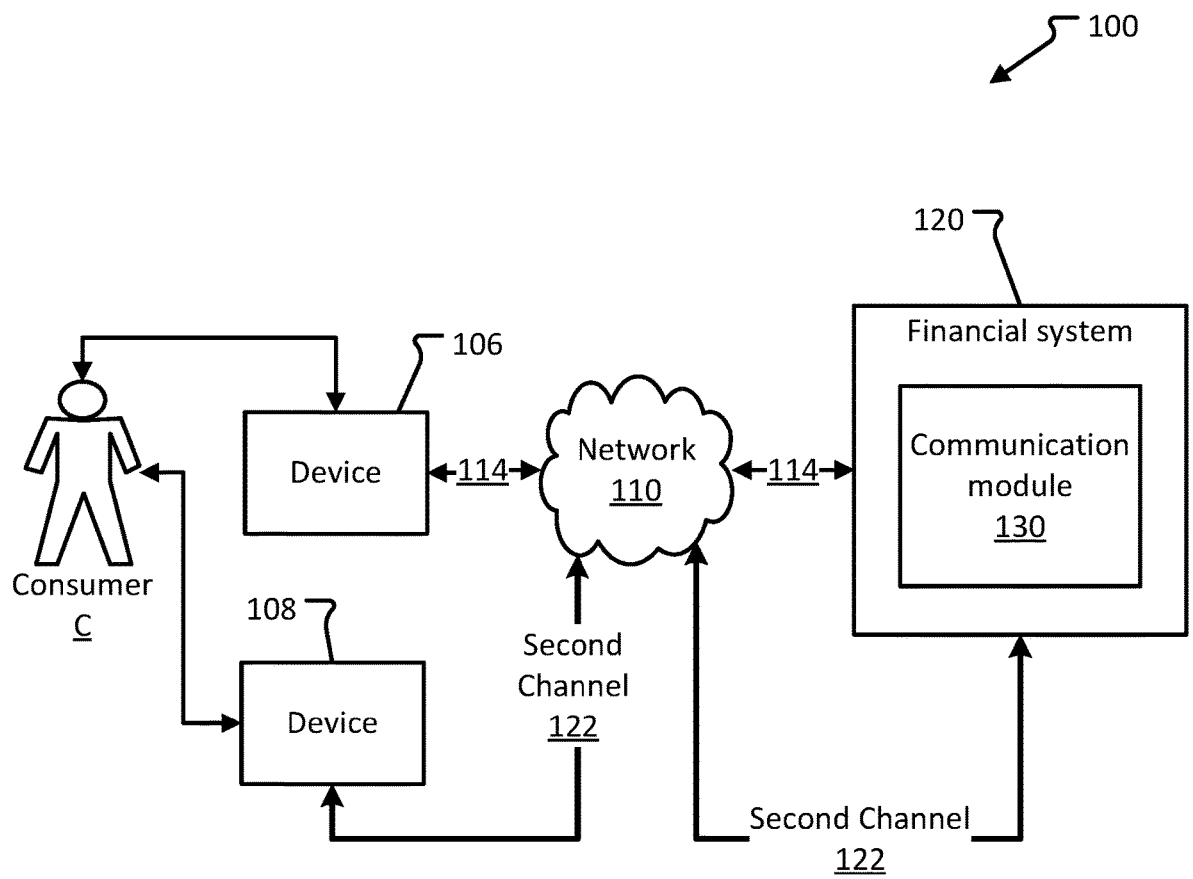
FIG. 1 shows an example transaction verification system environment.

Various embodiments of the present disclosure will be described in detail with reference to the drawings, wherein like reference numerals represent like parts and assemblies throughout the several views. Additionally, any examples set forth in this specification are not intended to be limiting and merely set forth some of the many possible embodiments.

The examples described herein are related to systems for approving, validating, and/or conducting a transaction. Completing the transaction requires the receipt of a one-time passcode (hereinafter referred to as an OTP). In some instances, additional layers of verification are used. Typically, the transaction is a financial transaction.

Usually, the OTP is generated by an institution associated with the financial transaction. After generating the OTP, the institution transmits the OTP to the consumer. Sometimes the OTP is associated with the consumer and/or the transaction. In some instances, delivery of the OTP fails. For example, a mobile network is not available to a consumer's mobile device. Because the mobile network is unavailable, a short message service (SMS) text message containing the OTP is undeliverable. As a result, the consumer cannot complete the transaction because the consumer cannot receive the OTP. It is with respect to these general environments that the examples below are directed.

FIG. 1 illustrates a schematic diagram of an example transaction verification system 100 environment. Example transaction verification system 100 receives and processes requests for financial transactions. The system 100 includes device 106 in communication with financial system 120. Device 106 and financial system 120 communicate over first channel 114. System 100 also includes device 108 in communication with financial system 120 over second channel 122. Consumer C has access to both device 106 and device 108, both of which are in communication with financial system 120 via network 110. Other embodiments can include more or fewer components.

Typically, consumer C is a person associated with an account at a financial institution that hosts financial system 120. Example financial institutions include banks, credit unions, credit card issuers, etc. Consumer C may have any one of many types of accounts with the financial institution, such as checking account, savings account, credit account, and so forth.

Device 106 is associated with consumer C. As an example, consumer C is a registered user of device 106, such as a mobile phone (or similar device) of consumer C. In contrast, device 108 is accessible by consumer C but not necessarily associated with, or registered to, consumer C. As an example, device 108 is a point of sale device or a device of a family member of consumer C.

Device 106 and 108 include some or all of the computing components shown in, and described with reference to, FIG. 4 below. For example, device 106 is any one of: a general computing device, a tablet computing device, a smartphone, a wearable computing device (such as an augmented reality device), a mobile computing device, or other similar device.

Device 108 is any one of the devices listed above with respect to device 106 and additionally including: a point of sale device, a kiosk, and an automated teller machine (ATM). In some instances, device 108 includes additional credential-obtaining features, such as a biometric reader. Example biometric readers include fingerprint readers, eye/retina/iris scanners, and face recognition readers.

Financial system 120 is one or more computing devices, each including a processing unit and computer readable media. Additional details regarding the computing components of financial system 120 are shown and discussed with reference to FIG. 4, below.

Financial system 120 can communicate with other computing devices (e.g., devices 106, 108 used by the consumer C) through one or more networks 110. The network 110 can include any type of wireless network, wired network, or any communication network known in the art. For example, wireless connections can include cellular network connections and connections made using protocols such as 802.11a, b, and/or g. Further, network 110 can be a local area network (LAN), a wide area network (WAN), the Internet, or a combination thereof. Communications can be implemented using wired and/or wireless technologies. In example embodiments, the financial system 120 includes one or more web servers that host one or more web sites that are accessible from the network(s).

Device 106 communicates with financial system 120 via first channel 114. First channel 114 can include short message service (SMS), push notifications, and an application running on device 106. Generally, push notification is a transmission of data from server to a client without a specific request from the client. A client device need not have a particular application running in order to receive push notification. Here, device 106 can be the client and financial system 120 can be the server.

Device 108 communicates with financial system 120 via second channel 122. In some instances, second channel 122 is the same as first channel 114. Alternatively, second channel 122 is different than first channel 114.

Generally, financial system 120 is programmed to facilitate the various business processes of a typical financial institution. More specifically, financial system 120 receives and processes requests for various types of financial transactions. Processing requests for various types of financial transactions includes transmitting one-time passcodes to devices accessible by consumer C.

Financial system 120 includes one-time passcode communication module 130, which provides functionality for transmitting one-time passcodes to consumers. One-time passcode communication module 130 also determines a delivery state of the one-time passcode: whether the one-time passcodes were successfully transmitted to consumer C. One-time passcode communication module 130 is discussed below in greater detail with reference to FIG. 2.

In instances when device 106 is a mobile device, consumer C can access financial system 120 using a client application running on device 106, such as a dedicated application or mobile browser. Because the mobile computing device is location-aware (i.e., includes Global Positioning System ("GPS")-related information about the current location of the mobile computing device), the client application is programmed to access location information and deliver that information to the financial system 120. Financial system 120 can use the location information when processing the transaction request.

Figure 2:
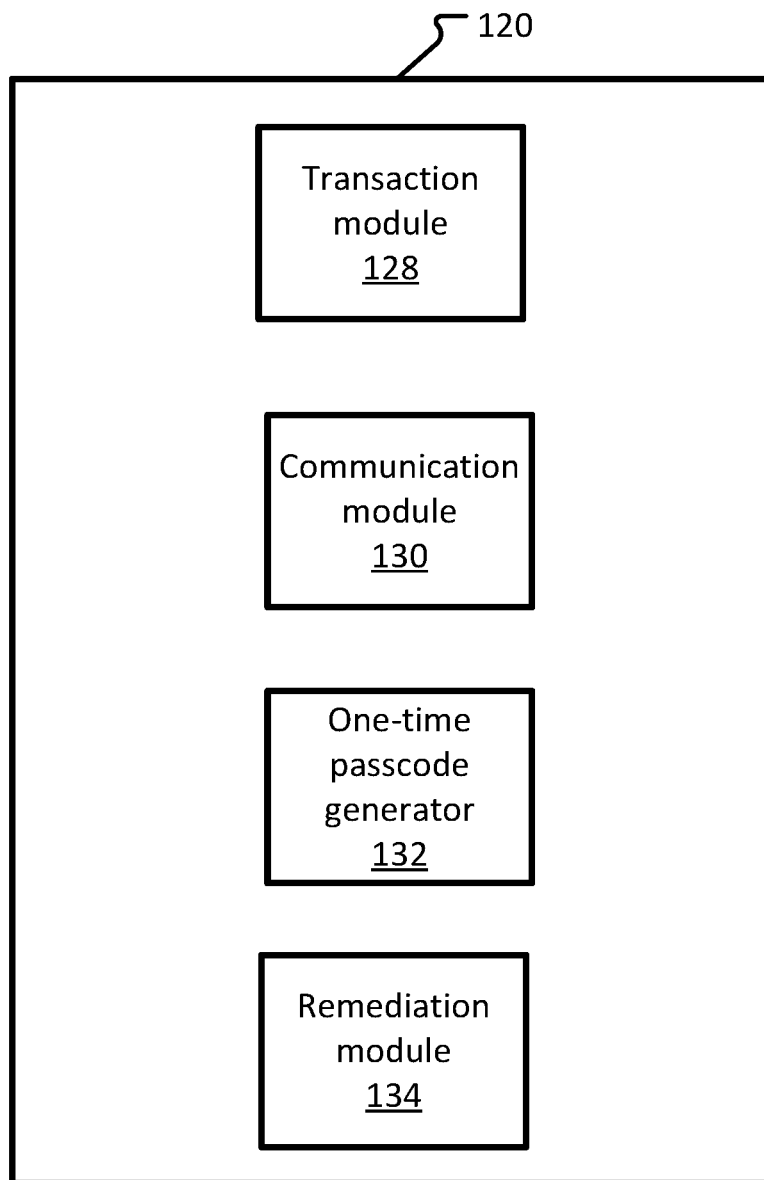
FIG. 2 shows example components of a financial system of FIG. 1.

FIG. 2 shows logical components of the financial system 120. In this example, the financial system 120 includes transaction module 128, one-time passcode communication module 130, one-time passcode generator 132, and remediation module 134. Other embodiments can include more or fewer components.

The financial system 120 is programmed to execute the modules 128, 130, 132, 134 according to firmware and/or software accessible to the financial system 120. For example, the processing unit of the financial system 120 executes software stored on computer readable media to implement the modules 128, 130, 132, 134.

Transaction module 128 receives requests for transactions and coordinates transaction execution. As mentioned above, example transactions include money withdrawal, money transfer, and others. Transaction module 128 can determine what type of authentication is required to complete or approve the transaction. For instance, certain transaction types, such as money transfers, or amounts, such as more than $200, can trigger two factor authentication. Other transactions simply require identifying the consumer's account and receiving an account password and PIN.

Transaction module 128 also accesses information about the account or accounts corresponding to the consumer C. Typical information includes passwords, biometric or other authentication data, types of accounts, account limits and/or balances, account verifications (such as whether the account or consumer C is approved for OTP usage), and/or family members and their device information.

If the requested transaction requires two factor authentication, transaction module 128 requests a one-time passcode from one-time passcode generator 132. In this example, one-time passcode generator 132 receives a request for an OTP, generates an OTP, and then transmits the OTP back to the requesting entity, the transaction module 128.

Communication module 130 manages communication between financial system 120 and device 106. Communication includes transmitting the OTP to the consumer and receiving notification regarding the transmission of the OTP. For instance, communication module 130 can receive notification that the OTP was not successfully transmitted because the address was incorrect, because the recipient was unavailable, and/or the network was not functioning correctly.

Remediation module 134 manages communicating the OTP to the consumer C via second channel 122. Remediation module 134 includes logic to determine whether transmission via second channel 122 succeeds and attempt alternate transmission paths. Based on transmission via second channel 122, remediation module 134 can transmit the OTP to alternate destinations.

For example, remediation module 134 can first communicate the OTP to device 106 via interactive voice response (IVR) or similar technology. If OTP transmission does not succeed via IVR, remediation module 134 can hand off OTP delivery to a point of sale (POS) device or kiosk associated with the transaction. In those instances, the POS device or kiosk acquires authentication information from consumer C, such as an account password, biometric data, etc. If the consumer C is authenticated, then the POS device or kiosk provides the OTP to the consumer C.

If financial system 120 does not receive the OTP back from the POS device or kiosk, remediation module 134 can transmit the OTP via push notification to device 106. If push notification does not succeed, then remediation module 134 can transmit the OTP to a third party, such as a device of a family member associated with consumer C, via SMS, push, or other means. If transmission to a family member does not succeed, then remediation module 134 can transmit the OTP to a different third party, such as a device of an entity associated with the transaction.

In some circumstances, communication from device 108 includes authentication data, such as biometric or password data, as well as an OTP. Remediation module 134 can verify that the biometric or password data match those stored for the particular consumer C. Additionally, remediation module 134 can validate that the OTP received from consumer C matches the OTP transmitted to device 108 and/or consumer C.

Figure 3:
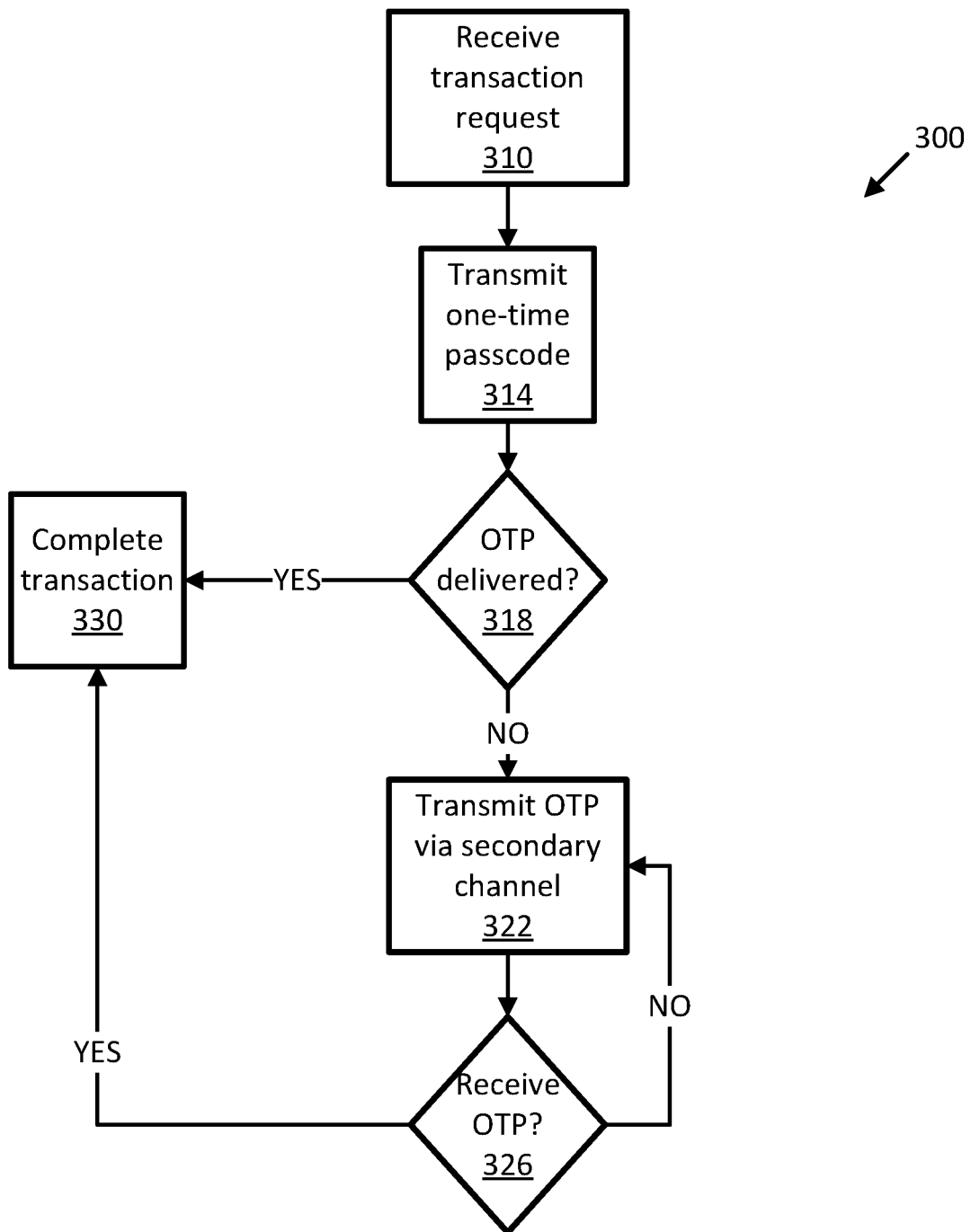
FIG. 3 shows an example method for conducting a transaction.

FIG. 3 illustrates an example method 300 for conducting a transaction. The example method 300 includes receiving a transaction request (operation 310), transmitting a one-time passcode (operation 314), determining whether the OTP was delivered (operation 318), transmitting an OTP via secondary channel (operation 322), determining whether an OTP was received (operation 326), and completing the transaction (operation 330). Typically, financial system 120, shown in FIGS. 1-2, executes the operations of example method 300. Other embodiments can include more or fewer operations.

The example method 300 begins when the financial system 120 receives a transaction request (operation 310). The transaction request can be sent by a retailer device, a device of a consumer having an account with a financial institution associated with financial system 120, or a point of sale device or kiosk (each of which may or may not be associated with the financial institution). The financial system generates a one-time passcode that can only be used to validate/authenticate the requested transaction.

After receiving the transaction request (operation 310), a one-time passcode is transmitted (operation 314). Typically, the one-time passcode is transmitted to a device associated with the consumer. Transmission can be via SMS, push notification, or an application specific to the financial institution that is running on the device.

Then a decision whether the OTP was delivered is made (operation 318). If the financial system determines that the OTP was delivered, method 300 continues to complete the transaction (330).

In some instances, the financial system can receive or request communication from a service provider or other network that the OTP was not delivered, that the communication was undeliverable, that the address was unavailable, or a similar communication. For example, the financial system can obtain the delivery status of an SMS message by a Get SMS Delivery Status request to an API Gateway. Another example is for the financial system to register an endpoint URL with an API Gateway and the URL receives notification of the final status of the message. Sometimes the financial system may not receive any OTP transmission back from the consumer. In these instances, financial system determines that the OTP was likely not delivered.

When the OTP is not delivered, method 300 proceeds to transmit an OTP via secondary channel (operation 322). Transmitting the OTP via secondary channel (operation 322) can include multiple transmissions, with different destinations, if each preceding transmission fails. Typically, the financial system attempts communication via additional channels based on those channels likely to be closest and/or most accessible to the consumer first. In some instances, operation 322 includes a ranking of preferable channels for the particular transaction. Alternatively, operation 322 can reference a pre-determined hierarchy of preferable channels and proceed accordingly. Example channels include POS device, kiosk device, alternate user device, biometric validation device, and merchant server.

Transmitting an OTP via a secondary channel (operation 322) can include contacting the user via a phone number associated with the consumer's device. In some instances, a person, such as a financial institution representative, calls the consumer's mobile device. In other instances, an interactive voice response (IVR) system calls the consumer's mobile device. During the call, the representative or IVR validates the consumer's credentials and posts the verification in the financial system. Then, the user can choose an OTP using the mobile device keypad. Thereafter, a password associated with the account and the user-selected OTP can be used to complete the transaction.

If the consumer is not able to be reached at their mobile device, the financial system attempts to communicate with the consumer via one or more other channels. The financial system can first check whether someone associated with the account has a mobile device nearby and, if so, transmit the OTP to that device.

If there are no user devices (associated with the account) near the consumer, the system can attempt OTP transmission through a POS or kiosk device associated with the requested transaction. As one example, the financial system contacts a server for the entity seeking to complete the transaction with the consumer. Using transaction identifiers, the financial system and the server can determine which POS device the consumer is using for the requested transaction. Then either the financial system or the server transmits the OTP to the POS device for the user to verify.

As another example, the financial system communicates with the POS device and indicates that the POS device should acquire an account password, biometric data, and/or questions/answers from the consumer and transmit that data back to the financial system for validation. If the input data received from the consumer correspond with those associated with the consumer, then the financial system can transmit the OTP to the POS or kiosk device. Thereafter, the consumer enters the OTP and the transaction proceeds.

Additionally, transmitting the OTP (operation 322) can include sending the OTP via push notification. If push notification is unsuccessful, then third party devices can be used as destinations for transmitting the OTP. For example, using the consumer device's location (from, e.g., GPS signals), the system can determine whether any joint account owners or family members of the consumer are also located close by. If so, the OTP can be transmitted to that person's mobile device via SMS or push notification.

In some implementations, multiple OTPs are transmitted during example method 300. Account holders and/or institutions associated with the consumer's account can include the requirement that multiple OTPs are needed for any, some or all transactions. Example accounts include joint accounts and multi-party accounts. Distinct OTPs are transmitted to registered devices (or secondary channels as described above) and each OTP must be used to complete a transaction.

As an example of such an account is a joint account where a parent and a child are joint account holders. In that example, the account may be arranged such that if one of the account holders requests a transaction that typically triggers an OTP requirement, both account holders must receive and enter the OTP to complete the transaction. As a specific example, any time the child requests a transaction valued over a certain amount, such as over $50, both the parent and the child receive unique OTPs and both must be received by the financial system in order for the transaction to be consummated.

Figure 4:
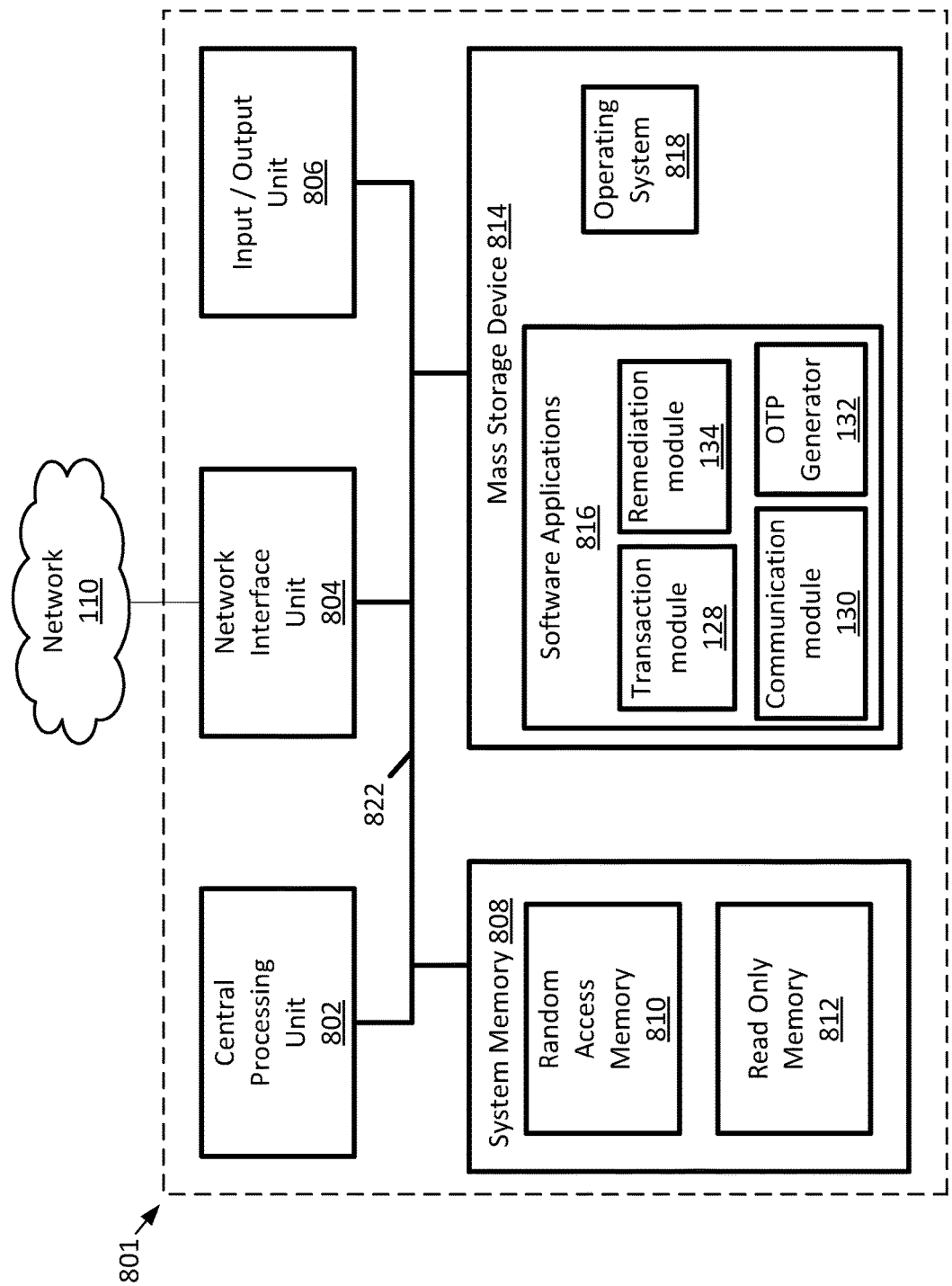
FIG. 4 shows example physical components of a computing device hosting the modules of the financial system of FIGS. 1 and 2.

FIG. 4 shows an example computing device 801 hosting software applications 816 including transaction module 128, communication module 130, one-time passcode (OTP) generator 132, and remediation module 134. The components of example computing device 801 are used in the computing devices of financial system 120. Other computing devices discussed herein, such as device 106 and device 108, can be configured in a similar manner.

As illustrated, the example computing device 801 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the example computing device 801, such as during startup, is stored in the ROM 812. The example computing device 801 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computer-readable data storage media provide non-volatile, non-transitory storage for the example computing device 801. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the example computing device 801.

According to various embodiments of the disclosure, the example computing device 801 may operate in a networked environment using logical connections to remote network devices through the network 103, such as a wireless network, the Internet, or another type of network. The example computing device 801 may connect to the network 110 through a network interface unit 804 connected to the system bus 822. It should be appreciated that the network interface unit 804 may also be utilized to connect to other types of networks and remote computing systems. The example computing device 801 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the example computing device 801 can store software instructions and data. The software instructions include an operating system 818 suitable for controlling the operation of the example computing device 801. The mass storage device 814 and/or the RAM 810 also store software instructions, that when executed by the CPU 802, cause the example computing device 801 to provide the functionality of the example computing device 801 discussed in this document. For example, the mass storage device 814 and/or the RAM 810 can store software instructions that, when executed by the CPU 802, cause the example computing device 801 to communicate a one-time passcode.

Although various embodiments are described herein, those of ordinary skill in the art will understand that many modifications may be made thereto within the scope of the present disclosure. Accordingly, it is not intended that the scope of the disclosure in any way be limited by the examples provided.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An electronic computing device comprising:
   a processing unit; and
   system memory, the system memory including instructions that, when executed by the processing unit, cause the electronic computing device to:
   transmit a one-time passcode to a device associated with a consumer via a first channel;
   receive notification regarding transmitting the one-time passcode, including a delivery state of the one-time passcode, wherein the delivery state indicates non-delivery of the one-time passcode via the first channel; and
   when the delivery state indicates that the one-time passcode was not delivered, transmit the one-time passcode via a second channel, wherein the second channel includes a selection between: an interactive voice response; a point of sale device; and a push notification;

wherein multiple one-time passcodes are transmitted to multiple consumers;

wherein an account associated with a transaction is a joint account; and wherein the multiple consumers are owners of the joint account.

2. The electronic computing device of claim 1, comprising further instructions that, when executed by the processing unit, cause the electronic computing device to receive a request for the transaction from the consumer.

3. The electronic computing device of claim 2, wherein the request is received from an automated teller machine.

4. The electronic computing device of claim 1, comprising further instructions that, when executed by the processing unit, cause the electronic computing device to determine the delivery state of the one-time passcode via the second channel.

5. The electronic computing device of claim 4, comprising further instructions that, when executed by the processing unit, cause the electronic computing device to transmit the one-time passcode via a third channel when the delivery state indicates the one-time passcode was not delivered via the second channel.

6. The electronic computing device of claim 1, comprising further instructions that, when executed by the processing unit, cause the electronic computing device to verify authentication information provided by the consumer.

7. The electronic computing device of claim 6, wherein the authentication information includes biometric data or password data.

8. The electronic computing device of claim 1, wherein the multiple one-time passcodes are required when the transaction exceeds a threshold.

9. A method, comprising:

transmitting a one-time passcode to a device associated with a consumer via a first channel;

receiving notification regarding transmitting the one-time passcode, including a delivery state of the one-time passcode, wherein the delivery state indicates non-delivery of the one-time passcode via the first channel;

when the delivery state indicates that the one-time passcode was not delivered, transmitting the one-time passcode via a second channel, wherein the second channel includes a selection between: an interactive voice response; a point of sale device; and a push notification; and transmitting multiple one-time passcodes to multiple consumers;

wherein an account associated with a transaction is a joint account; and wherein the multiple consumers are owners of the joint account.

10. The method of claim 9, further comprising receiving a request for the transaction from the consumer.

11. The method of claim 10, wherein the request is received from an automated teller machine.

12. The method of claim 9, further comprising determining the delivery state of the one-time passcode via the second channel.

13. The method of claim 12, further comprising transmitting the one-time passcode via a third channel when the delivery state indicates the one-time passcode was not delivered via the second channel.

14. The method of claim 9, further comprising verifying authentication information provided by the consumer.

15. The method of claim 14, wherein the authentication information includes biometric data or password data.

16. The method of claim 9, wherein the multiple one-time passcodes are required when the transaction exceeds a threshold.

* * * * *